United States Patent [19]

French et al.

[11] Patent Number: 5,061,916

[45] Date of Patent: Oct. 29, 1991

[54] EVENT DRIVEN REMOTE GRAPHICAL REPORTING OF BUILDING AUTOMATION SYSTEM PARAMETERS

[75] Inventors: Jonathan C. French, Rockford, Ill.; David R. Rounds, Beloit, Wis.; James R. Herdeman, Rockford; Brent S. Bernardi, Loves Park, both of Ill.

[73] Assignee: Barber-Colman Company, Rockford, Ill.

[21] Appl. No.: 529,945

[22] Filed: May 29, 1990

[51] Int. Cl.[5] .......................... G08B 19/00; G08B 1/00
[52] U.S. Cl. ..................................... 340/522; 340/506; 340/525; 340/531; 358/400; 358/441; 358/442; 364/550; 379/100
[58] Field of Search ............... 340/522, 506, 525, 531; 358/108, 400, 441, 442; 364/141, 138, 550; 379/100

[56] References Cited

U.S. PATENT DOCUMENTS

| | | | |
|---|---|---|---|
| 4,644,478 | 2/1987 | Stephens et al. | 340/506 |
| 4,933,667 | 6/1990 | Shaw et al. | 340/525 |
| 4,977,390 | 12/1990 | Saylor et al. | 340/506 |
| 4,991,200 | 2/1991 | Lin | 358/441 |

OTHER PUBLICATIONS

Brochure entitled "Network 8000 System Overview", May 1989.
"New Controls Gear Highlights Atlanta HVAC Exposition", Energy User News, Feb. 1990.
Data Sheet on the Quadram JT-FAX9600.

Primary Examiner—Donnie L. Crosland
Attorney, Agent, or Firm—Leydig, Voit & Mayer

[57] ABSTRACT

A system and method for reporting of alarms (or other conditions) to a remote location, in a building automation system. The alarm is reported in graphical format which shows not only the information related directly to the alarm, but also additional information, including graphical information, intended to put the alarm in context. The system provides the user the ability to specify a transmittable alarm, and to define a graphical message for that alarm which includes fixed or static building parameters associated with real time building operating parameters. Upon occurrence of an alarm condition, the system assembles a graphical display for transmission which includes the specified fixed parameters and measured data for the real time operating parameters. The system assures that data is collected and assembled into the graphic display for all specified real time operating parameters, then initiates a facsimile transmission of the graphic display to a remote location.

15 Claims, 4 Drawing Sheets

EVENT DRIVEN REMOTE GRAPHICAL REPORTING OF BUILDING AUTOMATION SYSTEM PARAMETERS

FIELD OF THE INVENTION

This invention relates to building automation systems, and more particularly to reporting of specified event information such as alarm conditions to a remote site.

BACKGROUND OF THE INVENTION

Building automation systems are well known, and have advanced to the state of incorporating various sophisticated features such as the capability of reporting the fact that an alarm has occurred to an offsite location. In some cases, the systems are capable of reporting the actual alarm condition and may or may not report is generally alphanumeric, intended to go, for example, either to a printer coupled in the network of the building automation system, or via leased lines to the printer in an external service organization. Such building automation systems have been limited in their capacity to report adequate information to a remote serviceman, usually requiring that the serviceman call into the system (or to a person in the monitored building) to get more complete information as to the nature of the alarm condition. If a service person intending to respond to an alarm condition can arrive on site with the parts most likely needed to fix the problem which caused the alarm, downtime should be minimized. The remote reporting systems have not been completely effective in providing adequate and related information, and often rely on the knowledge and experience of the service personnel to obtain adequate information during the course of responding to an alarm.

As an alternative, the service personnel can respond to the alarm condition by making an onsite visit to the building to get a first-hand view of the conditions. This approach suffers the consequences potentially having the parts or tools needed for repair unavailable on site. As a further complicating factor, the delay caused by inadequately equipped service personnel (inadequately equipped both with respect to information and repair parts) attempting to fix a problem, can cause extended outages with potentially serious consequences if the failure is in building mechanical systems whose operating status is essential to one or more of the building functions.

Building automation systems have the capacity to monitor numerous building operating parameters and also have the capacity to assemble comparatively huge amounts of data for display to an attendant at a console which is centrally located in the building automation system. These types of systems pose two main problems. The first is an excess of information, in that there are so many sensors and so many parameters to be monitored, and so many "minor" alarm conditions that the console operator is inundated with information, potentially slowing his response to a real alarm condition. Many systems are set up such that any parameter which varies outside its specified limits will result in an alarm, even if that alarm has no significant potential impact on the overall building or the associated automation system. A console operator having become accustomed to such "alarms" may fail to recognize a true alarm when one occurs.

A second problem with such building automation systems is related to the first, in that the person stationed at the central console is often not the one who is familiar with the details of maintaining the monitored equipment, and thus often is not in a position to fully appreciate the significance of a true alarm. Oftentimes, the person attending the console is primarily responsible for transmitting alarm information to a remotely located service organization which then assumes the responsibility for making the repair. Thus, communication of alarm conditions to the persons ultimately responsible for fixing the conditions which caused the alarm often must be translated through the console operator who may be more or less adept at associating information which is very relevant to the ultimate user, i.e., the repair organization.

Alphanumeric computer printouts are capable of conveying much information, but often in a format which is not readily assimilated by a reader, particularly in an emergency situation. Oftentimes it is possible after the conditions which caused the alarm have been rectified, to analyze the alphanumeric computer printout and demonstrate how the information on the printout pointed to the cause of the alarm. However, in real time, when the user is presented with a printout and asked to react immediately, without adequate time for reflection or analysis, the alphanumeric printout does not always trigger a response geared to the conditions which caused it.

It might be thought useful to present alarm information in a manner, such as a graphical manner, which is more easily assimilated in a high pressure emergency situation by a person charged with reacting to the emergency. However, that approach has not apparently been taken with building automation systems. Instead, to the extent those systems have provided graphical displays of relevant information, those displays have apparently been limited to display at a central console for view by an operator, and the disadvantages of that have been explained above. With respect to remote site reporting, the primary consideration seems to have been the rapid, reliable and timely transmission of the condition of the parameters which are out of tolerance, possibly associated with additional data, but all in an alphanumeric format which can require substantial interpretation on the part of the receiver in order to anticipate the nature of the fault and type of equipment which might be required to repair it.

SUMMARY OF THE INVENTION

In view of the foregoing, it is a general aim of the present invention to provide a remote reporting facility for a building automation system which has the capability of assembling and transmitting to a remote location information relevant to an alarm condition which includes both real time and fixed parameters, and to include in a report to the remote location current and related real time data for the real time parameters.

In that respect, an object of the present invention is to provide a building automation system with a remote reporting facility, capable of remotely reporting graphical displays relating to an alarm condition, and including in the graphical display both real time and fixed parameters in such a way that the system assures the integrity of the real time parameters before transmitting an alarm message. It is thus an object to provide a graphical report of an alarm condition in such a way that the report can be relied on as demonstrating not only the actual parameters which are in alarm, but also reliably reporting other parameters thought to be relevant to the alarm condition and its repair.

An object of the present invention is to provide a graphical reporting capability for a building automation system which is not only highly economical and thus fits in with the overall objective of building automation systems, but which is also highly reliable in assuring that the data included in an alarm report has relevance (in terms of currency) to the alarm condition.

A subsidiary object of the invention is to provide an alarm reporting system which is highly flexible in the type of compatible equipment which can receive an alarm as well as in the manner of altering the identity of the person or persons to receive an alarm display.

In another subsidiary aspect of the invention, an object is to allow customization of the alarm reporting system to the particular needs of the building or building operator by allowing the operator to specify not only the conditions which give rise to the alarm, but all of the parameters which are to be reported, as well as the graphical format in which the report is to be made, thereby to allow the operator almost complete freedom in the manner in which an alarm is to be reported.

It is a feature of the invention to provide a system for remote graphical reporting of alarm conditions which produces reports at the remote location which are more readily and rapidly understandable in that they associate alphanumeric and graphical information in such a way as to provide not only real time operating conditions of the monitored building, but also to put those conditions in the context of the building system being monitored.

In certain embodiments of the invention, the "in context" feature provides the user with the capability to specify the context between actual conditions which are in the alarm state and related parameters, knowledge of which is believed to be useful to better understand the alarm state of the specified alarm parameters. The user in addition has the ability to provide additional context by specifying fixed parameters including graphical information from static files maintained in the building automation system which tends to put both the alarm parameters and the non-alarm but related parameters in an understandable context. As a result, the report transmitted to the remote site is highly information bearing and is intended to provide a snapshot of the relevant factors for rapid diagnosis and repair of faulty equipment at the building site.

It is a further feature of the invention that the graphical reports delivered to the remote site are checked for integrity before transmission in that the system assures that all real time data for real time operating parameters is both current and assembled into the graphical representation before transmission is accomplished. Thus, the opportunity to provide misleading graphical reports is minimized.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
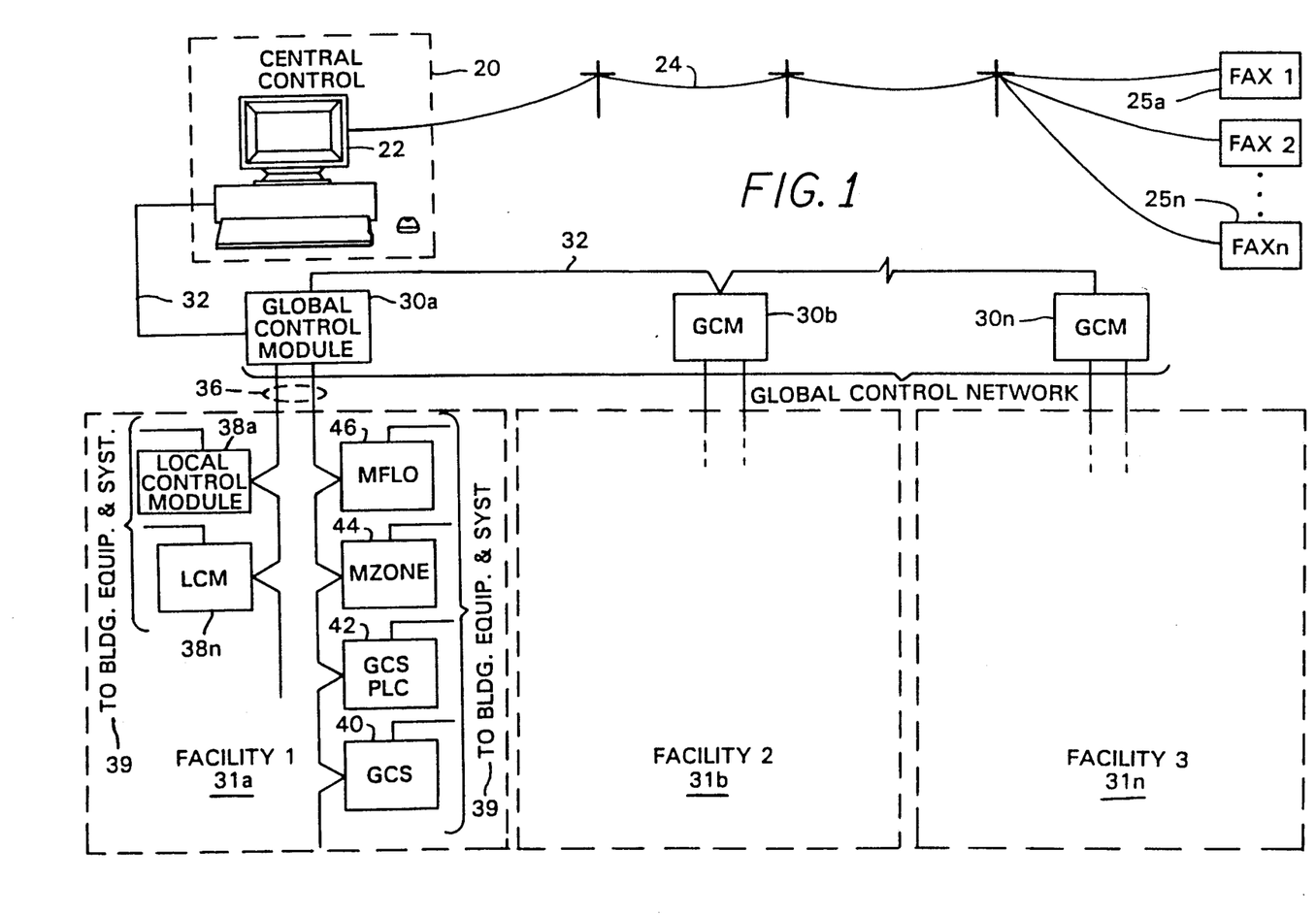
FIG. 1 is a block diagram illustrating a building automation system with remote graphical reporting capability exemplifying the present invention.

Turning now to the drawings, FIG. 1 is a block diagrammatic illustration of a building automation system which includes an event driven graphical facsimile interface exemplifying the present invention. The remote reporting system is centered around a central control system 20 which preferably includes in a host computer 22 which communicates with the remaining elements of the system, processes the programs and maintains the data necessary for remote graphical reporting, and when remote graphical reporting is required, utilizes communication lines 24 to send a graphical message to one or more facsimile receivers 25a-25n. The facsimile transmission is preferably initiated and accomplished via a standard facsimile communication board, available from a number of sources, which can be plugged directly into an expansion slot of a personal computer 22, which serves as the control element for the central control 20.

Before referring in greater detail to the actual graphical reporting system, attention will first be directed to the various features of a typical building automation system, in order to better illustrate the nature of the problem solved by the present invention. The exemplary building automation system is characterized by a number of digital controllers which are connected together, either in hardwired fashion, or by way of a network, to monitor mechanical and electrical equipment in a building (or a collection of buildings), to report status of the monitored equipment to a central location, and to report alarms to a central location when such alarms occur. Alarms may also be reported to the central location 20 from one or more remote facilities using dial-up telecommunications. The primary intent of the typical building automation system is to reduce costs of maintaining the building, both by reducing staffing costs for maintaining the mechanical equipment in the building, as well as the actual operating costs of the equipment (such as by minimizing energy usage and maximizing fuel efficient operation). Successful building automation systems are those which reduce the overall costs of maintaining and operating the building, along with providing the expected reliability to make it appear to building occupants that the building is being maintained onsite, even though maintenance has been transferred offsite for either all or part of each operating day.

Building automation systems are implemented primarily to reduce costs of operating mechanical and electrical equipment needed to control the environment in facilities such as office buildings, school systems, and manufacturing facilities. Building automation systems typically use networks of distributed digital controllers which are responsible for controlling equipment in a specific zone, as well as sharing data with other controllers. These controllers must respond to events such as mechanical breakdown, temperature and humidity changes, and others, by initiating control changes and communicating those conditions, in the form of alarm messages, to a human operator. These alarm messages are used in conjunction with building automation system reports to allow the operator to control the facility in a highly customized, cost-effective manner. Examples of building automation system reports are alarm histories, energy usage and cost histories, trend reports, maintenance time reminders, and others.

Referring again to FIG. 1, it is seen that there are provided a plurality of global control modules $30a-30n$ connected together by means of a network 32. In the current state of technology, the network 32 is preferably implemented as a token passing ring, in order to provide reporting efficiency and speed much higher than has been possible using polling networks. The network 32 is also extended to the central control 20, such that the processor 22 in the central control 20 is also a member of the local area network. Alternatively, the connection between the processor 22 and the global control module $30a$ may be implemented via other communication modalities, such as dial-up lines, telecommunications, or other data transmission media. The global control modules can be located at different sites in a building, or in different buildings, and are the most general of the control modules adapted to parcel out tasks among a plurality of more specific digital controllers. The global control modules generally have a significant amount of programmable functionality such that they are relatively easily customized to the requirements of a particular facility or site (e.g., facilities $31a-31n$) in which they are located. Global control modules, as well as the more specific control modules to be discussed below, are commercially available elements of the Barber-Colman Network 8000 System.

The facility $31a$ associated with global control module $30a$ is illustrated in FIG. 1, it being appreciated that each of the other global control modules $30b-30n$ can have the same or a similar facility ($31b-31n$) associated with it. It is seen that the global controller $30a$ has a network 36 emanating therefrom which includes a number of different types of control elements. For example, connected to the network 36 are a plurality of local control modules $38a-38n$ which themselves are connected to building equipment generally illustrated at 39. The local control modules also provide a degree of programmable functionality, but more significantly include a plurality of input/output points for physical connection to monitored equipment. Thus, in the illustrated embodiment, the local control modules are representative of the devices which provide actual monitoring of building equipment for reporting measured real time values for the monitored variables.

Other input/output points are provided by a global control satellite unit 40 and a further global control satellite unit 42. The units 40, 42 are similar to each other except that the unit 42 has the capability of communicating on the power lines whereas the module 40 communicates only on the network. Both are connected to the network and thus can be controlled by the global control module $30a$ and also can report conditions back to that global control module for passing along the network 32. Both the modules 40 and 42 contain input/output points connected to physical equipment in a similar fashion to the connections of the local control module, and thus are a source of further real time operating data.

Other input/output points are provided by controllers 44, 46. The controller 44 is intended to be representative of a microzone controller which is a unitary digital controller for a packaged unit, (such as a rooftop heating and cooling system) and has control functions for controlling that unit, as well as sensing functions for monitoring sensors on the unit. The controller 46 is intended to represent a microflo controller which is representative of the type of units for monitoring and controlling a variable air volume (VAV) unit, and thus would typically control flow controllers as well as actuators for controlling flow equipment such as fans, dampers and local heating coils in a VAV air terminal unit.

It will now be appreciated that the control modules 38-46 are located in the building (or buildings) to be automated, and thus can be included under a single roof or at widely distributed geographical points. The networks 32 interconnecting the global control modules as well as the networks 36 interconnecting a single global control module with its local controllers can take the form of hardwiring between physically proximate units, telephone lines for dial-up between units, leased lines, and the like. It is not unusual to include many forms of intercommunication in a single building automation system, such that it is difficult to assume that when a given set of data is to be collected it can all be done within a relatively short time since some modes of communication can take longer than others, some are more or less reliable than others, etc. Thus, to assemble a given set of relevant data might require utilization of a global control satellite module 40 to secure operating data via direct wiring to its connected equipment, and communicate that information via a bus 36, which might be hardwired to a global control module; in addition, a global control module 30 might also need to collect information from, and also to poll, various local control modules $38a-38n$ at distributed sites, and receive reports back from those modules via leased lines in one case or telephone lines in another, before all of the relevant data is assembled. At that point, all of the relevant data may be available in one of the global control modules $30a$, but still unavailable to the host until it is communicated by the token passing ring 32 which can again be implemented in one or more of the available communication technologies. In short, it will be appreciated that a massive amount of data can be collected by a building automation system, but assembling relevant elements of that data from remote sites (which may become relevant to each other only upon occurrence of a particular alarm) is not necessarily a trivial task.

Figure 2:
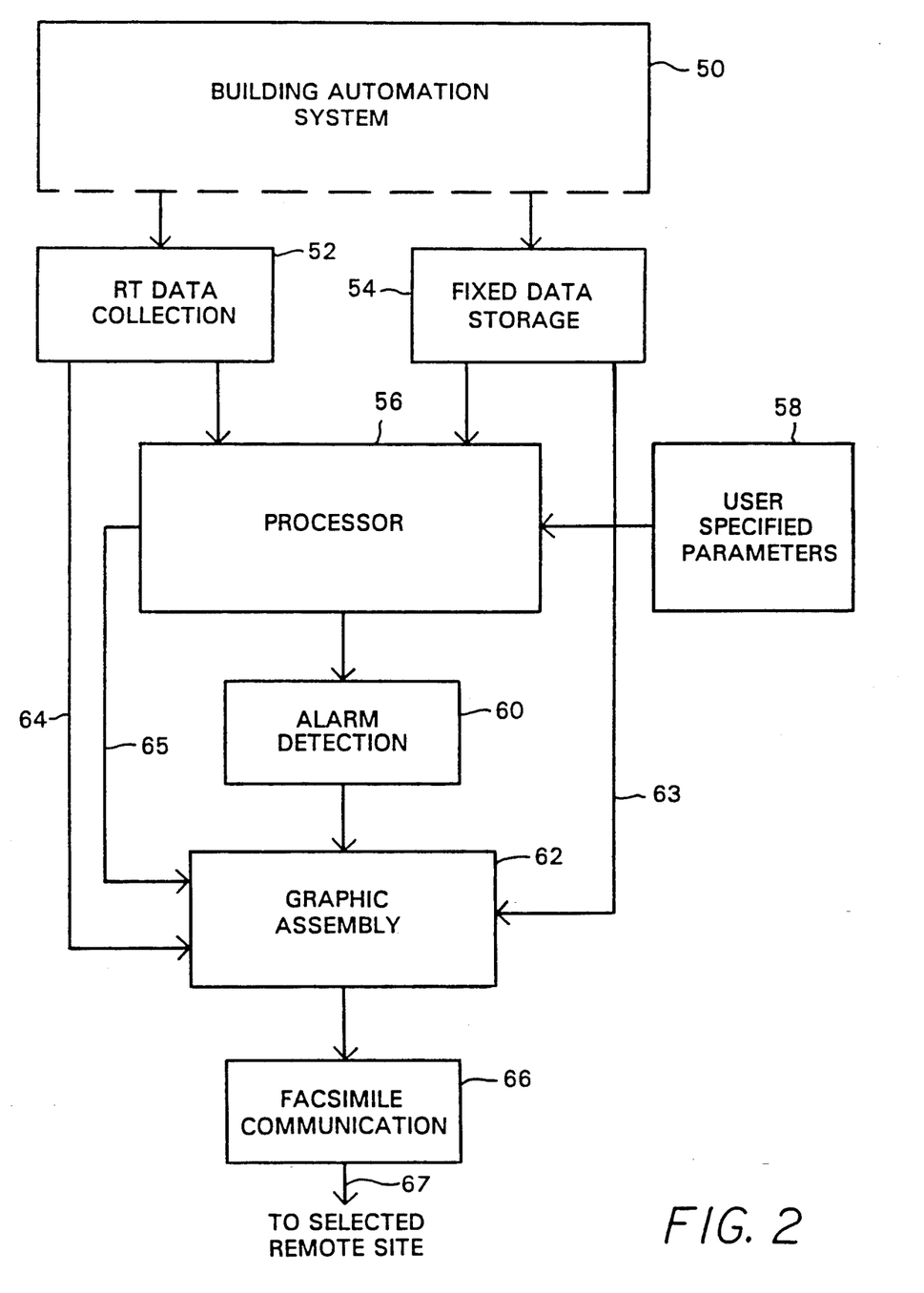
FIG. 2 is a block diagram better illustrating the central controller of the system of FIG. 1.

Turning now to FIG. 2, there is shown a breakdown of the elements of an event driven graphical facsimile interface and its association with a building automation system. The elements of FIG. 2 can be considered at primarily residing in the central control 20, which is typically configured as a unit on the main system network along with the global control modules $30a$, $30n$. If no major network is utilized, the central control 20 can be associated with the single global control module on the network, communicating to all of the subsidiary local modules arranged in the hierarchy below it.

For purposes of FIG. 2, the major building related elements of the system are shown as resident in a building automation system block 50 which is intended to include all of the local modules illustrated in FIG. 1, much of the global control network 30, 32 of that figure, and the many monitored sensors in the building automation system. The dashed line closing the bottom of block 50 in FIG. 2 is intended to illustrate that the remaining elements illustrated below that block can also be assimilated into the overall building automation system 50. It is for purposes of illustration that they are broken out in FIG. 2. It is seen that the building automation system 50 is interfaced to a pair of storage elements 52, 54, the former being adapted to collect and store real time data from the building automation system, and the latter to store fixed data relating to that system. Both are customizable for a particular automation system.

The fixed data storage 54 can typically be thought of as represented by floor plans or other diagrams for the building to be monitored, information relating to the mechanical equipment in the building (such as model numbers and specifications for heaters, chillers and the like), desired formats for periodic reports, dial-up numbers for reporting of alarm conditions, and a myriad of other relevant information which can be customized for a given installation but need not change regularly during the operation of that installation. That information is sometimes referred to as "fixed" herein, in order to distinguish it from the real time data generated by monitoring sensors; the "fixed" data is naturally amenable to change from time to time.

The real time data collection element 52, however, is intended to represent the ever changing variable data which is monitored by the system and which can serve to drive the automation system controls as the measured variables change. For example, as room temperature gets too high, the building cooling system can be energized to return the room temperature to within desired set points. The real time data collection element 52 typically contains a relatively large amount of storage for maintaining the current status of the numerous sensing transducers in the system. The storage elements are not necessarily relevant to each other, but selected elements of data relevant to a particular occurrence can be selected under the control of a processor 56 programmed first of all to perform the building automation system functions, and secondly to perform the remote graphical reporting of the present invention.

The details of the structure and operation of the processor 56 in performing the building automation system functions will not be described in great detail, since they are known to those skilled in the art, and such a processor is readily available for purchase, such as in the aforementioned Network 8000 system from Barber-Colman. Suffice it to say that the processor 56 monitors the real time data collected by element 52, compares that data against allowable limits, and operates controlled equipment within the building automation system (not illustrated) to maintain the system within the established setpoints.

With respect to remote reporting of system parameters in general, and alarms in particular, the processor 56 is associated with an element 58 which provides the user the opportunity to specify parameters for triggering a report in the first instance and for establishing the content of the report for transmission. Thus, the element 58 will typically include an interactive inquiry software program (operated on the computer 22), and an element of memory programmed to query the user as to the need for and nature of certain reports. The user will answer the queries by inputting information into the processor 56 intended to specify trigger points which will generate a report. Such trigger points usually include alarm conditions which are intended to cause the transmission of an alarm report to a remote site, alerting a repairman that attention is needed within a predetermined time frame. Another type of trigger point often utilized is a "time trigger". More particularly, the processor within the system maintains a real time clock, and that clock can be utilized to trigger certain events. For example, during the portion of the day when the building is manned, no remote alarms need be generated, but the system can be set to be triggered during the non-manned hours to transmit remote alarms. As a further example, alternate facsimile numbers can be associated with a particular alarm, and a time trigger utilized to establish which of the alternate numbers will be dialed at any given time of day. As a final example, status reports can be sent at particular times on specified days to predetermined locations, all as triggered by the real time clock within the system. Other examples of transmittable reports, which can be specified by the user through module 58 include periodic reports such as the aforementioned maintenance reports and the like, intended to be generated at predetermined intervals or after the accumulation of a predetermined number of events in order to provide a desired set of operating conditions to a remote location.

In addition to specifying the triggering events for remote transmission of reports, the user interface 58 also provides the means for tailoring each of the reports to the requirements of the building automation system. Thus, the user can, for example, specify a particular triggering event, such as a failed chiller unit, and then specify for that particular alarm event the elements of fixed and real time data which are to be reported to the remote location as the alarm report. For example, the user can specify with that particular alarm that the floor plan for the area served by the chiller is to be transmitted along with the existing temperature in each room on the floor plan, the outside temperature, the air flow and temperature within particular ducts, and other information which the user in his best judgment believes is relevant to the service man who will be dispatched to repair the chiller. The graphical information can also include catalog information on the chiller, a diagram showing the main repair elements in the particular chiller, and other information tailored in as much detail as thought necessary to achieve maximum effectiveness of the repairman who will be dispatched to the site. The processor 56 and user interface 58 provide the capability for specifying multiple events for reporting, and a different format or set of data to be transmitted for each of the multiple reports. In its preferred form, the module 58 will thus include in tabular form in memory the following elements of related information for each report or alarm: (1) the triggering condition, (2) the graphical format, (3) the fixed data parameters for the report, (4) the real time operating parameters for the report, (5) the numbers of the facsimile receivers to which the report is to be sent, (6) the priority indication of whether the alarm report is to be transmitted to a remote location, and (7) the class or alarm type (e.g., fire, security, HVAC) of report and specification to which remote location(s) each class of alarm is to be sent. As a further example illustrating flexibility, while a chiller failure might generate the type of report generally described above, an alarm triggered by activation of a security device might be configured to generate a graphical report which includes a floor plan highlighting all of the proximity sensors in the area of the triggered security device, and indicating their current status. It will also be appreciated that each of the reports can be associated with a different receiving station; in the foregoing example, the chiller failure might be reported to a service organization engaged to repair the building equipment, whereas the security alarm might be dispatched to the local police station or security station.

In carrying out the invention, means are provided for detecting the trigger events which have been user specified, and in response thereto for triggering the transmission of a graphical report. To that end, alarm detection means 60 are associated with the processor 56 to monitor the system conditions and compare those system conditions against the user specified (by means of module 58) trigger events. When one or more of the monitored points indicate that an event has occurred which should generate the transmission of a graphical report, the alarm detection module 60 signals a graphic assembly module 62 to assemble the fixed and real time data which has been specified for that event, and to format an appropriate report. To that end, the graphic assembly unit 62 has a connection 63 to the fixed data storage element 54 and extracts from the fixed data storage, depending on which of the multiple reports is to be generated, the particular set of fixed data intended for that report. Typically, that data will include graphical information, and can also include alphanumeric information intended to give context to the graphical information.

The graphic assembly module 62 also has a circuit connection 64 to the real time data collection element 52 and thus is intended to collect and assemble into the transmittable graphic, the values for the real time data associated with the parameters earlier specified. The graphic assembly module 62 also has a circuit connection 65 to the processor 56 by which those elements interact to assure that real time values for all of the specified real time parameters have been collected by the module 62 and assembled into the graphic. After all of those elements are assembled, the processor 56 signals the graphic assembly module 62 to initiate a facsimile communication utilizing module 66, which as noted above may be a commercially available facsimile communication card for a personal computer. It is seen that the unit 66 is connected via telephone line 67 to the schematically illustrated "remote site" which, as noted above, can be a plurality of sites whose identity is specified by telephone numbers initially specified through use of module 58. Thus, the module 66 dials the number of the assigned facsimile receiver, and upon indication of a connection, transmits the assembled graphical report.

The importance of the interaction between the graphic assembly module 62 and the processor 56 (which can indeed be configured a single processor operating on a program module intended to assemble the graphic) is important in assuring that the graphic which is transmitted to the remote site contains information which is relevant (in the context of time relevance) to the report being made. Thus, the processor 56 has access to the real time data collection module 52 and can assure that all of the data which is inserted into the graphic for the specified real time parameters has been collected within a specified number of seconds or minutes. Such a feature is particularly significant when the real time data collected within module 52 can originate from multiple widely distributed geographical sources and can be reported on multiple media. In some cases, it is better to give no value for a particular parameter than to specify a previously stored but out-of-date parameter not recently collected.

Thus, the processor by means of connection 65 continually monitors the graphic being assembled in module 62. The processor, by means of tables, for example, created within the user specified parameter module 58, knows all of the real time parameters which are to be assembled into the graphic, and can monitor the insertion of each of those parameters so that the processor is aware of the point in time when all of the real time parameters are available, current and inserted in the graphic. It is at that time that the processor 56 will initiate the transmission of the graphic via the module 66, lending the best assurance available that the information transmitted offsite will not be misleading.

Figure 3:
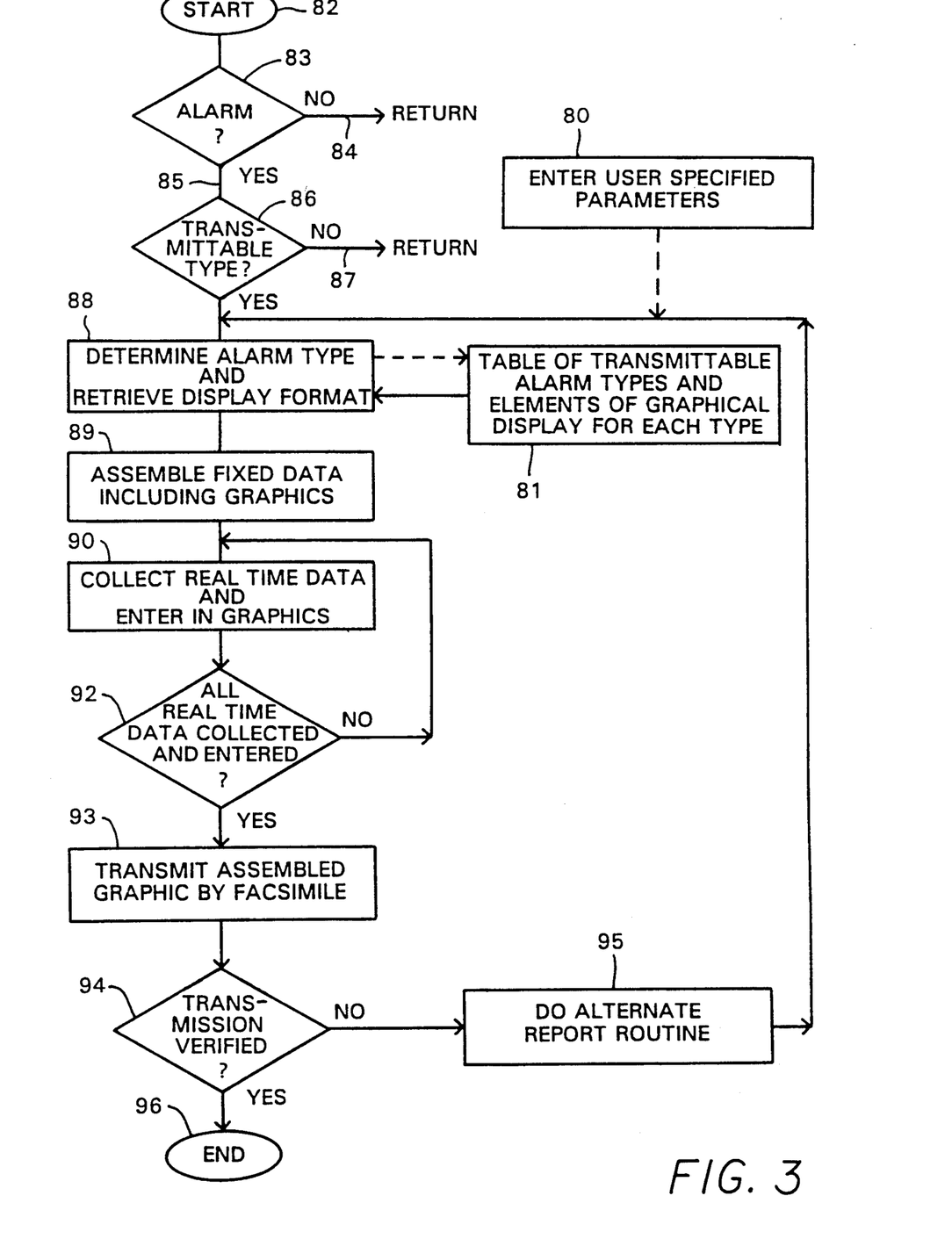
FIG. 3 is a flowchart illustrating the process of assembling and transmitting graphical reports in accordance with the present invention.

Turning now to FIG. 3, there is shown a system flow diagram illustrating the process performed by the system of FIGS. 1 and 2 in remote reporting of graphical information. At the upper right of the diagram, there is shown a block 80 which relates to the step of entering user specified parameters, described in hardware terms in connection with element 58 of FIG. 2. Thus, in the step 80 of FIG. 3, the user enters the trigger events which specify reports to be transmitted. The user also enters by means of step 80 the format of the reports to be transmitted, including the elements of fixed data, the real time parameters to be transmitted, and any ancillary information to be sent, as well as the telephone numbers of the facsimile machines which are to receive reports. Such reports can include both alarm reports as well as the other reports specified above. The user specified information generated in step 80 is stored in a step 81 which is identified as a table of transmittable alarm types and elements of graphical display for each type. Thus, the table 81 includes both the trigger events as well as an identification of the elements of the report which are to be transmitted upon detection of the associated trigger. It is recalled that the trigger events can include not only alarm conditions, but also real time conditions triggered by the real time clock within the system to generate periodic reports or to alter the type of report or report destination dependent upon the time of day at which an alarm occurred.

Turning to the lefthand portion of FIG. 3, system monitoring of building automation system parameters initiates with a start step 82 followed by a test 83 to detect if an alarm condition has been detected. If no alarm condition has been detected, as in the ordinary course, the process branches at 84 to return to normal processing. However, in the case an alarm has been detected (or a trigger event for a non-alarm report), the process branches at 85 to a further test 86 to determine if the alarm is of the transmittable type. If it is not, the process returns to normal processing at 87. However, if the alarm which has been detected is of the transmittable type, the process branches to a step 88 to determine the alarm type and retrieve the display format. The step 88 operates in conjunction with the table 81 to determine, from the alarm type, which elements of collected and stored data need to be assembled into the transmittable report. A step 89 is then performed to assemble the fixed data which usually includes the graphics information. It is recalled that the fixed data is stored within element 54 of the system of FIG. 2. Along with collection of the fixed data for assembly into the graphic report, a step 90 is performed to collect real time data for the real time parameters needed for the report, and to assemble that data into the graphical display. A test 92 is continually performed to determine whether all of the real time data needed for the report has been collected and entered into the graphic. If it has not, the process continues to repeat the step 90. The test continues to be made until the test 92 determines that all of the real time data has been collected and entered, following which the process branches to a step 93 to transmit the assembled graphic to one or more remote facsimile stations. While it is not illustrated in FIG. 3, it is possible, of course, upon processing of the loop including steps 90 and 92 for a predetermined period of time, to enter in place of a real time data a default entry such as "none available", and assemble that into the graphic display in place of a real time data point, following which the test 92 will be satisfied so that the report, even though incomplete, will be transmitted.

Emphasis is placed on the fact that the transmit step 93 includes, as an important element, the graphic which had been assembled in the prior steps along with the real time data for the specified parameters assembled into the graphic. Thus, the transmission 93 is configured to be accomplished by means of facsimile, such that the transmission is receivable in any intended location by simply installing a relatively inexpensive facsimile machine which then provides a report containing all of the relevant information in context adapted for instantaneous understanding.

In certain systems, it is desirable to perform a further step 94 to determine that receipt of the transmission is verified. Such a step is easily performed with commercially available facsimile machines, since the interchange of transmission signals between a sending and receiving machine provides an indication that the transmission has been accurately completed. If the transmission is verified, the process branches to a step 96, which is the completion of the transmission sequence, after which the processor can return to its normal functioning. If, however, the transmission is not verified in the test 94, a step 95 is performed to engage an alternate report routine. The alternate routine can be programmed to suit a number of requirements. For example, the alternate report routine will typically have a number of levels which are reached in sequence until one of the levels generates a verified transmission. Thus, if a first transmission is attempted and no verification obtained, the alternate routine 95 will first attempt to resend the transmission to the same facsimile number. If that transmission is not verified a second time, the alternate report routine 95 will then cause a search of the table 81 to determine an alternate number for reporting of that particular alarm condition. The re-reporting and alternate reporting will continue until the report is transmitted and the transmission verified. At some level of accessing alternate destinations, in addition to reporting the original initiating alarm, the system may also generate a further report indicating the inability to verify communication with multiple stations, which itself may be a second type of alarm reported to a different station.

Figure 4:
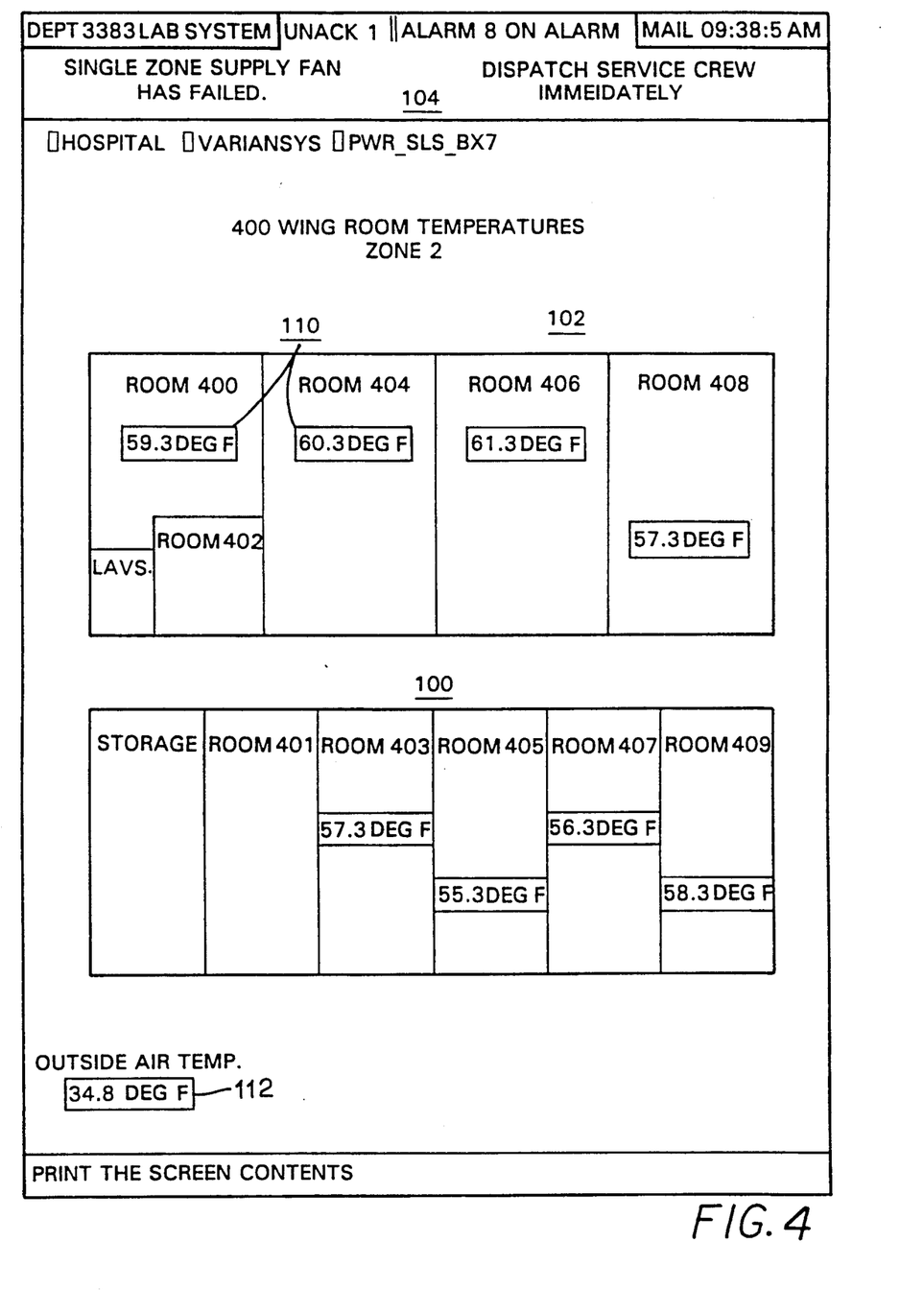
FIG. 4 is a diagram illustrating an exemplary graphical display as received at a remote facsimile machine.

While the extreme flexibility of the system will be apparent from the foregoing description, a specific example of a type of report is illustrated in FIG. 4 to demonstrate the high degree of specificity which can be included in any given report. Thus, FIG. 4 show a typical graphical report which is transmitted from a central station 20 (FIG. 1) to a selected telefax machine 25a to report fixed information from the building automation system along with currently measured real time operating parameters from that same system. FIG. 4 has a central portion 100 which illustrates a floor plan for a particular area of a hospital. The portion above the floor plan 100 indicates identification information for the particular floor plan and facility, and the section 104 in the header immediately above section 102 indicates the exact nature of the alarm including the time and date of transmission of the alarm report. It is seen that the header information includes the indication "single zone supply fan has failed, dispatch service crew immediately", and that indicates to the service person the type of action needed. It is also seen that on the floor plan 100 there are a series of blocks 110 which indicate the actual room temperature which had been measured in real time just before the time of the report, indicating which areas of the hospital were particularly affected, and the degree to which the system has lost control by virtue of the failure. A further block 112 indicates outside air temperature for further information in determining the urgency of the report. A further page of the report, not illustrated in the drawings, can include a diagram of the mechanical room in which the failed supply fan is located, and highlight the exact location of the supply fan as well as any monitored parameters available directly from that equipment.

It will thus be appreciated that a significant amount of graphical and readily assimilatable information can be transmitted so that the repairman when he arrives at the site, is ready to function.

A modification of the illustration of FIG. 4 can also highlight the safety aspects of the building automation system. Assuming that the alarm was triggered by a fire rather than a failed supply fan, and the building automation system is configured to transmit a report such as that shown in FIG. 4 in connection with such an alarm, the actual real time temperatures within the specific rooms would be of extreme value to a firefighting team intending to determine how best to approach the fire extinguishing problem. Thus, if data indicated by time to have occurred only minutes earlier indicates that room 405 were say 25° F. hotter than those adjoining it, the firefighters would be advised before they even entered the area of the location of the most intense portion of the fire.

It will thus be appreciated that what has been provided is an important auxiliary element for a state-of-the-art building automation system in order to provide maximum intelligibility to information reported to a remote site. The intelligibility is enhanced by including graphics in the transmission along with actual real time operating data. Credibility is enhanced by providing a system which assures that the data is current, accurate and assembled, before transmission is allowed. Context is provided by the user in initially configuring the elements to be included in each report, such that the information when transmitted includes all of the data thought relevant to the particular alarm at hand. That extreme amount of relevant information is transmitted to a remote site which need be specialized only to the extent of including a ubiquitous facsimile machine.

What is claimed is:

1. A system for remote graphical reporting of related sets of parameters monitored by a building automation system, the building automation system including means for monitoring real time conditions of a plurality of operating building parameters, and means for storing fixed information regarding static system parameters, the system comprising, in combination:
- a report definition subsystem for defining a plurality of transmittable reports which includes:
  - means for establishing user specified trigger conditions intended to trigger each remote report transmission, and
  - means for defining a plurality of transmittable graphics for the transmittable reports, the transmittable graphics including user specified static system parameters associated with user specified real time operating parameters,
- a reporting transmission subsystem for transmitting the reports including the transmittable graphics which includes:
  - means for detecting the user specified trigger conditions and determining which of the graphical reports is to be transmitted,
  - means for merging the user specified static system parameters and monitored real time values for the user specified real time operating parameters into one of the defined transmittable graphics,
  - means for assuring that monitored real time data is available for the user specified real time operating parameters and is included in the completed transmittable graphic, and
  - means enabled subsequent to assembly of the transmittable graphic for transmitting a facsimile report including the transmittable graphic.

2. The combination as set forth in claim 1 wherein the means for establishing user specified trigger conditions include means for defining alarm conditions intended to transmit an alarm report to a remote alarm receiving station.

3. The combination as set forth in claim 1 wherein the means for establishing user-specified trigger conditions includes a real time clock, and means for defining time triggered conditions intended to transmit reports at specified times of day.

4. The combination as set forth in claim 1 wherein the report definition subsystem further comprises means for specifying time related trigger conditions intended to trigger reports or report variations at predetermined times.

5. The combination as set forth in claim 1 wherein the means for defining a plurality of transmittable graphics includes storage means for storing information relating each of the transmittable graphics to an associated set of specified real time operating parameters.

6. The combination as set forth in claim 1 wherein the remote reporting transmission subsystem further includes graphic assembly means adapted to insert a "no data" indicator in place of a specified real time operating parameter when the last-mentioned real time operating parameter is unavailable for insertion into the transmittable graphic.

7. The system as set forth in claim 1 wherein the report definition system further includes means for specifying one or more remote telefax numbers identifying a facsimile receiver for each of the transmittable reports, and the reporting transmission subsystem includes means for selecting and dialing the telefax number of the station designated to receive the transmittable graphic report.

8. A system for remote graphical reporting of alarm conditions in a building automation system, the system comprising the combination of:
- means for monitoring real time conditions of a plurality of operating building parameters and triggering an alarm when one or more predetermined parameters deviate beyond predetermined limits,
- means for storing a set of fixed system parameters relating to the building automated by the building automation system, the fixed parameters including graphical representations illustrating at least some of the fixed system parameters,
- means for assembling data for an alarm transmission including a set of fixed parameters and measured values of real time operating parameters relevant to a particular alarm, said last mentioned means including means for assembling a graphical display for transmission including fixed parameters and values for real time operating parameters intended to display the alarm condition in context, and
- means for transmitting a facsimile alarm message including the assembled graphical display.

9. The combination as set forth in claim 8 in which the system further includes means for reporting a plurality of different alarm conditions, each having an associated set of fixed parameters and measured values of real time operating parameters relevant to the particular alarm, said system comprising means for assembling the particular graphic associated with the triggered alarm and transmitting the facsimile alarm message including the associated graphical display.

10. The combination as set forth in claim 9 in which the system further comprises means for associating one or more identifying facsimile numbers for transmission of the alarm messages, and means for dialing the associated facsimile numbers before transmitting the assembled graphic display.

11. A method of remotely and graphically reporting related sets of parameters from a building on system, the building automation system including means for monitoring the real time conditions of a plurality of building operating parameters, and means for maintaining fixed information regarding system parameters of the building, the method comprising the steps of:
- defining a transmittable report condition and specifying a graphical display to be transmitted in response to detection of said transmittable report condition, specifying for the graphical display a set of fixed operating parameters and a set of real time operating parameters to be included in the transmission upon detection of a transmittable report condition,
- sensing the actual occurrence of a transmittable report condition and in response thereto:
  - assembling a graphical display including the specified fixed operating parameters and data for the specified real time operating parameters;
  - assuring that data for all of the real time operating parameters is collected and entered into the graphical display, and
  - after said assurance, transmitting said display via facsimile to one or more remote facsimile receivers thereby to provide a graphical display indicating the report condition in context.

12. The method as set forth in claim 11 further including associating with each transmittable report condition one or more identifying numbers of intended facsimile receivers, and the step of transmitting further includes dialing of the intended receivers for the graphical display to be transmitted.

13. The method as set forth in claim 11 in which the step of defining a transmittable report condition further includes defining time related trigger information further specifying the graphical display to be transmitted, and the step of sensing the actual occurrence of a transmittable report further includes monitoring real time to detect time triggered events.

14. The method as set forth in claim 11 wherein the step of defining a transmittable report condition further includes defining time related trigger information further specifying the graphical display to be transmitted, and the step of sensing the actual occurrence of a transmittable report further includes monitoring real time and transmitting said display via facsimile to a selected remote facsimile receiver dependent upon the actual time of transmission.

15. The method as set forth in claim 11 wherein the step of defining a transmittable report condition includes specifying a time of day trigger event, and the step of sensing the actual occurrence of a transmittable report includes monitoring real time to sense the time of day trigger event.

* * * * *